(12) United States Patent
Qu

(10) Patent No.: US 6,811,720 B2
(45) Date of Patent: Nov. 2, 2004

(54) MEDIUM HAVING A HIGH HEAT TRANSFER RATE

(75) Inventor: YuZhi Qu, San Jose, CA (US)

(73) Assignee: New Qu Energy Ltd., Wanchai (HK)

( * ) Notice: Subject to any disclaimer, the term of this patent is extended or adjusted under 35 U.S.C. 154(b) by 18 days.

(21) Appl. No.: 09/928,571

(22) Filed: Aug. 13, 2001

(65) Prior Publication Data

US 2003/0030029 A1 Feb. 13, 2003

(51) Int. Cl.$^7$ ................................................ C09K 5/14
(52) U.S. Cl. .................... 252/70; 165/104.15; 165/185; 165/905; 428/34.6; 428/469; 428/470; 428/471; 428/472; 428/699; 428/701; 428/702
(58) Field of Search ........................ 252/70; 165/104.15, 165/185, 905; 428/34.6, 469, 470, 471, 472, 699, 701, 702

(56) References Cited

U.S. PATENT DOCUMENTS

| | | | |
|---|---|---|---|
| 5,542,471 A | 8/1996 | Dickinson | 165/170 |
| 6,132,823 A | 10/2000 | Qu | 428/34.6 |
| 2003/0066638 A1 * | 4/2003 | Qu et al. | 165/186 |

* cited by examiner

Primary Examiner—Anthony J. Green
(74) Attorney, Agent, or Firm—Morrison & Foerster LLP

(57) ABSTRACT

A heat transfer medium is shown, having a very high heat transfer rate that is simple in structure, easy to make, environmentally sound, rapidly conducts heat, and preserves heat in a highly efficient manner. Also shown is a heat transfer surface and a heat transfer element utilizing the heat transfer medium.

16 Claims, 11 Drawing Sheets

MEDIUM HAVING A HIGH HEAT TRANSFER RATE

FIELD OF THE INVENTION

The present invention relates to a heat transfer medium having a high heat transfer rate, a heat transfer surface, and a heat transfer element utilizing the heat transfer medium.

BACKGROUND OF THE INVENTION

Efficiently transporting heat from one location to another always has been a problem. Some applications, such as keeping a semiconductor chip cool, require rapid transfer and removal of heat, while other applications, such as dispersing heat from a furnace, require rapid transfer and retention of heat. Whether removing or retaining heat, the heat transfer abilities of the material utilized define the efficiency of the heat transfer.

For example, it is well known to utilize a heat pipe for heat transfer. The heat pipe operates on the principle of transferring heat through mass transfer of a fluid carrier contained therein and phase change of the carrier from the liquid state to the vapor state within a closed circuit pipe. Heat is absorbed at one end of the pipe by vaporization of the carrier and released at the other end by condensation of the carrier vapor. Although the heat pipe improves thermal transfer efficiency as compared to solid metal rods, the heat pipe requires the circulatory flow of the liquid/vapor material and is limited by the material's vaporization and condensation temperatures. Consequently, the heat pipe's axial heat transfer rate is further limited by the magnitude of the material's latent heat of liquid vaporization and the rate of transformation between liquid and vapor states. Further, the heat pipe is convectional in nature and suffers from thermal losses, thereby reducing the thermal efficiency. It is generally accepted that when two substances having different temperatures are brought together, the temperature of the warmer substance decreases and the temperature of the cooler substance increases. As the heat travels along a heat conducting conduit from a warm end to a cool end, available heat is lost due to the heat conducting capacity of the conduit material, the process of warming the cooler portions of the conduit and thermal losses to the atmosphere.

I disclose a heat transfer composition and the method for its preparation in U.S. Pat. No. 6,132,823, issued Oct. 17, 2000.

In that patent, the heat transfer medium was made up of three layers deposited on a substrate. The first two layers were prepared from solutions exposed to the inner wall of the conduit. The third layer was a powder comprising various combinations. The first layer was placed onto an inner conduit surface, the second layer was then placed on top of the first layer to form a film over than inner conduit surface. The third layer was a powder preferably evenly distributed over the inner conduit surface.

The first layer was nominated an anti-corrosion layer to prevent etching of inner conduit surface. The second layer was said to prevent the production of elemental hydrogen and oxygen, thus restraining oxidation between oxygen atoms and the conduit material. The third layer, referred to as the "black powder" layer, was said to be activated once exposed to a minimum activation temperature of 38° C. Consequently, it was said elimination of any of the three layers from the prior heat transfer medium might have an adverse effect on heat transfer efficiency.

In addition, the method for preparing the prior medium was complicated and cumbersome. For instance, formation of the first layer might involve nine chemical compounds prepared in seven steps. Formation of the second layer might involve fourteen compounds prepared in thirteen steps. Formation of the third layer might involve twelve compounds prepared in twelve steps. In addition, if the components of each layer were combined in an order not consistent with the listed sequence and conforming to the exceptions noted in my patent, the solutions made for such preparation were potentially unstable.

Generally, the heat transfer medium of the present invention eliminates or improves upon many of the noted shortcomings and disadvantages. The heat transfer medium of the present invention preferably is made up of a layer, most preferably a single layer, deposited on a substrate, prepared from a group of twelve inorganic compounds selected from the list below and formed in a single layer. The improved medium not only reduces the number and types of compounds used in the medium, but also effectively reduces the number of steps required for the preparation of the medium without compromising heat transfer efficiency.

SUMMARY OF THE INVENTION

The present invention provides a high heat transfer rate heat transfer medium that is useful in even wider fields, is simple in structure, easy to make, environmentally sound, and rapidly conducts heat and preserves heat in a highly efficient manner.

The present invention provides a heat transfer medium, typically inorganic in nature, which is a composition. The composition comprises or, in the alternative, consists essentially of the following compounds mixed together in the ratios or amounts shown below. The amounts may be scaled up or down as needed to produce a selected amount. Although the compounds are preferably mixed in the order shown, they need not be mixed in that order.

Cobaltic Oxide ($Co_2O_3$), 0.5%–1.0%, preferably 0.7–0.8%, most preferably 0.723%;

Boron Oxide ($B_2O_3$), 1.0%–2.0%, preferably 1.4–1.6%, most preferably 1.4472%;

Calcium Dichromate ($CaCr_2O_7$), 1.0%–2.0%, preferably 1.4–1.6%, most preferably 1.4472%;

Magnesium Dichromate ($MgCr_2O_7 \cdot 6H_2O$), 10.0%–20.0%, preferably 14.0–16.0%, most preferably 14.472%;

Potassium Dichromate ($K_2Cr_2O_7$), 40.0%–80.0%, preferably 56.0–64.0%, most preferably 57.888%;

Sodium Dichromate ($Na_2Cr_2O_7$), 10.0%–20.0%, preferably 14.0–16.0%, most preferably 14.472%;

Beryllium Oxide (BeO), 0.05%–0.10%, preferably 0.07–0.08%, most preferably 0.0723%;

Titanium Diboride ($TiB_2$), 0.5%–1.0%, preferably 0.7–0.8%, most preferably 0.723%;

Potassium Peroxide ($K_2O_2$), 0.05%–0.10%, preferably 0.07–0.08%, most preferably 0.0723%;

A selected metal or ammonium Dichromate ($MCr_2O_7$), 5.0%–10.0%, preferably 7.0–8.0%, most preferably 7.23%, where "M" is selected from the group consisting of potassium, sodium, silver, and ammonium.

Strontium Chromate ($SrCrO_4$), 0.5%–1.0%, preferably 0.7–0.8%, most preferably 0.723%; and, Silver Dichromate ($Ag_2Cr_2O_7$), 0.5%–1.0%, preferably 0.7–0.8%, most preferably 0.723%.

The percentages expressed just above are weight percentages of the final composition once the composition has been dried to remove the added water.

The present invention also provides a heat transfer surface comprising a surface substrate covered at least in part by the high heat transfer rate inorganic heat transfer medium of the present invention.

The present invention also provides a heat transfer element comprising the high heat transfer rate inorganic heat transfer medium situated on a substrate.

The objects and advantages of the invention will become apparent from the following detailed description of the preferred embodiments thereof in connection with the accompanying drawings, in which like numerals designate like elements.

DESCRIPTION OF THE INVENTION

Composition

Figure 1A:
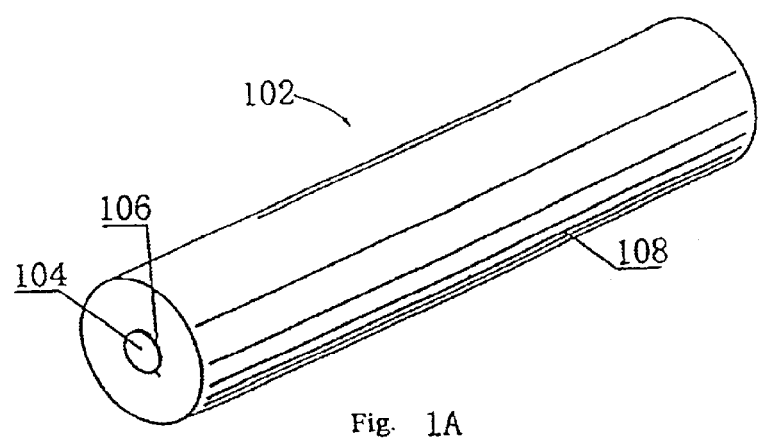
FIG. 1A shows a perspective view of heat transfer pipe element according to the present invention.

The present invention provides a heat transfer medium, which is regarded as a composition, having high heat transfer rate. The composition comprises or, in the alternative, consists essentially of the following compounds mixed together in the ratios or amounts shown below. The amounts may be scaled up or down as needed to produce a selected amount. Although the compounds are preferably mixed in the order shown, they need not be mixed in that order.

Cobaltic Oxide ($CO_2O_3$), 0.5%–1.0%, preferably 0.7–0.8%, most preferably 0.723%;

Boron Oxide ($B_2O_3$), 1.0%–2.0%, preferably 1.4–1.6%, most preferably 1.4472%;

Calcium Dichromate ($CaCr_2O_7$), 1.0%–2.0%, preferably 1.4–1.6%, most preferably 1.4472%;

Magnesium Dichromate ($MgCr_2O_7 \cdot 6H_2O$), 10.0%–20.0%, preferably 14.0–16.0%, most preferably 14.472%;

Potassium Dichromate ($K_2Cr_2O_7$), 40.0%–80.0%, preferably 56.0–64.0%, most preferably 57.888%;

Sodium Dichromate ($Na_2Cr_2O_7$), 10.0%–20.0%, preferably 14.0–16.0%, most preferably 14.472%;

Beryllium Oxide (BeO), 0.05%–0.10%, preferably 0.07–0.08%, most preferably 0.0723%;

Titanium Diboride ($TiB_2$), 0.5%–1.0%, preferably 0.7–0.8%, most preferably 0.723%;

Potassium Peroxide ($K_2O_2$), 0.05%–0.10%, preferably 0.07–0.08%, most preferably 0.0723%;

A selected metal or ammonium Dichromate ($MCr_2O_7$), 5.0%–10.0%, preferably 7.0–8.0%, most preferably 7.23%, where "M" is selected from the group consisting of potassium, sodium, silver, and ammonium.

Strontium Chromate ($SrCrO_4$), 0.5%–1.0%, preferably 0.7–0.8%, most preferably 0.723%; and, Silver Dichromate ($Ag_2Cr_2O_7$), 0.5%–1.0%, preferably 0.7–0.8%, most preferably 0.723%.

The percentages expressed just above are weight percentages of the final composition once the composition has been dried to remove the added water.

A most highly preferred composition is made in the following way. The following inorganic compounds are added in the amounts shown below (+/−0.10% of each compound) and in the manner discussed below:

Cobaltic Oxide ($Co_2O_3$), 0.01 g;

Boron Oxide ($B_2O_3$), 0.02 g;

Calcium Dichromate ($CaCr_2O_7$), 0.02 g;

Magnesium Dichromate ($MgCr_2O_7 \cdot 6H_2O$), 0.2 g;

Potassium Dichromate ($K_2Cr_2O_7$), 0.8 g;

Sodium Dichromate ($Na_2Cr_2O_7$), 0.2 g;

Beryllium Oxide (BeO), 0.001 g;

Titanium Diboride ($TiB_2$), 0.01 g;

Potassium Peroxide ($K_2O_2$), 0.001 g;

"M" Dichromate ($MCr_2O_7$), 0.1 g; where "M" is selected from the group consisting of potassium, sodium, silver, and ammonium, Strontium Chromate ($SrCrO_4$), 0.01 g; and Silver Dichromate ($Ag_2Cr_2O_7$), 0.01 g.

The compounds are added sequentially in the order listed just above to a container containing 100 ml of generally pure, preferably twice-distilled, water until dissolved. The mixture is mixed at ambient temperature, e.g., about 18–20° C. an then preferably heated to a temperature in the range of 55–65° C., preferably about 60° C. and then stirred and mixed at such temperature for, e.g., about 20 minutes, until complete dissolution is attained. The composition is and is then ready for application.

The heat transfer medium of the present invention may be applied to any suitable substrate, e.g., placed upon a metal conduit or even glass conduit, so long as the chosen surface is substantially free of metallic oxides, grease or oils. To optimize the quality of the resulting heat transfer composition, it is preferable to apply the composition in a very low humidity environment, e.g., 35–37% relative humidity, in any event less than about 40% relative humidity. It is also desirable to apply the composition to a closed volume that is isolated from water (vaporous or liquid) once applied.

To achieve desirable thermal conductivity in a heat conducting conduit or chamber containing the composition, the quantity of the heat transfer medium of the present invention added into the chamber is dependent on the volume of that cavity. Preferably, the (volume of composition/volume of cavity) ratio is desirably is maintained in the following ratio ranges: 0.001 to 0.025, more preferably 0.01 to 0.025, most preferably in the following ratios: 0.025, 0.02, 0.0125, and 0.01. There is no need to perform any pre-coating step for the conduit. Once the conduit is packed or filled with desirable amount of the medium, the conduit is heated up to 120° C. to permit evaporation of the twice-distilled water. The conduit or chamber is then sealed and is ready for use as a heat conducting device.

The amount of heat transfer medium of the present invention used to prepare the conduit may be varied according to the intended use of the finished products. The preparation of the improved medium and the manufacture of the thermal conductivity surfaces or conduits using the heat transfer medium of the present invention can be achieved and completed in one single step.

The improved medium is operable at a temperature range of 70–1800° C. without losing its characteristics. The surface may be constructed in any shape pursuant to the shapes of the intended products without being restricted by any construction angles. For instances, the conduit may be made in a straight, curved, zigzag, grid, spiral, or a snake-like shape.

It has been observed that thermal conductivities and heat transfer rates for the medium of the present invention are in excess of 32,000 times that of pure, metallic silver.

It should be noted that if the components of the improved medium are combined in an order not consistent with the listed sequence, the medium can become unstable and may result in a catastrophic reaction. Further, should metals be used as substrates for the medium of the present invention, it is recommended that the metal be clean, dry, and free of any oxides or scales. This can be accomplished by conventional treating by, for example, sand blasting, weak acid washing, or weak base washing. Any materials used to clean and treat the conduit should be completely removed and the inner conduit surface also should be dry prior to adding the medium to conduit.

EXAMPLE 1

A high heat transfer heat medium was prepared by the following process, and the compounds were added in the manner as discussed below:

Cobaltic Oxide ($Co_2O_3$), 0.01 g;
Boron Oxide ($B_2O_3$), 0.02 g;
Calcium Dichromate ($CaCr_2O_7$), 0.02 g;
Magnesium Dichromate ($MgCr_2O_7 \cdot 6H_2O$), 0.2 g;
Potassium Dichromate ($K_2Cr_2O_7$), 0.8 g;
Sodium Dichromate ($Na_2Cr_2O_7$), 0.2 g;
Beryllium Oxide (BeO), 0.001 g;
Titanium Diboride ($TiB_2$), 0.01 g;
Potassium Peroxide ($K_2O_2$), 0.001 g;
"M" Dichromate ($MCr_2O_7$), 0.1 g; where "M" is selected from the group consisting of potassium, sodium, silver, and ammonium,
Strontium Chromate ($SrCrO_4$), 0.01 g; and
Silver Dichromate ($Ag_2Cr_2O_7$), 0.01 g.

The compounds were added sequentially in the order listed just above to a container containing 100 ml of twice-distilled water until dissolved. The mixture was mixed at ambient temperature of 20° C. and then heated to the temperature of 60° C. and then stirred and mixed at such temperature for 20 minutes, until complete dissolution was attained. The composition was then ready for application.

EXAMPLE 2

The composition obtained from Example 1 was used as the heat transfer medium of the present invention. To optimize the quality of the resulting heat transfer composition, it is preferable to apply the composition in any event less than about 40% relative humidity. Under the relative humidity of 36%, the heat transfer medium of the present invention was applied to a metal conduit substrate. The metal substrate is selected from carbon steel, stainless steel, aluminum, copper, titanium, and nickel and alloys thereof, or non-metal conduit, either glass or ceramic, and then formed into the required heat transfer element. The selected surface of the substrate is substantially free of metallic oxides, grease or oils.

To achieve desirable thermal conductivity in a heat conducting conduit or cavity containing the composition, the quantity of the heat transfer medium of the present invention applied was dependent on the volume of that cavity or conduit. The medium of the present invention was applied over the selected surface, an inner wall of the cavity or conduit, in (volume of composition/volume of cavity) ratios of 0.025, 0.02, 0.0125, and 0.01. There was no need to perform any pre-coating step for the cavity or conduit. Once the cavity or conduit was packed or filled with desirable amount of the medium, it was heated up to 120° C. to permit evaporation of the twice-distilled water. After the application of the heat transfer composition on the substrate, the substrate with the heat transfer medium of the present invention was then sealed in the conduit or cavity isolated from water (vaporous or liquid) and was ready for use as a heat conducting device.

The amount of the heat transfer medium of the present invention used to prepare the conduit may also be varied according to the intended use of the finished products. The preparation of the improved medium and the manufacture of a high heat transfer surfaces (of cavity or conduit) using the heat transfer medium of the present invention was achieved and completed in one single step.

The improved medium was operated at a temperature range of 70–1800° C. without losing its characteristics. The surface was constructed in various shapes pursuant to the shapes of the intended products without being restricted by any construction angles. For instances, the conduit was made in a straight, curved, zigzag, grid, spiral, or a snake-like shape in required dimension and appearance to comply with various fields of applications.

A standard heat pipeline is a technique of rapidly transferring thermal energy from a hot end to a cold end of the pipeline by the absorption and emission of extensive amount of latent heat during the liquid vaporization and vapor condensation respectively. The heat transfer rate in axial direction depends on the vaporization heat of a liquid and the transformation rate between liquid and vapor, in addition to the limitation of substrate materials, temperature and pressure.

A pipe element of the present invention axially transferred heat in a rate much faster than that of any other metal bars or standard heat pipelines. The pressure intensity inside the pipe element was much lower than that of any other heat pipes. The upper limit of the allowed temperature equaled to the highest temperature of application for the materials of the pipe element. According to the present invention, the pipe element may be designed and manufactured to meet the various requirements in size and shape.

Figure 1B:
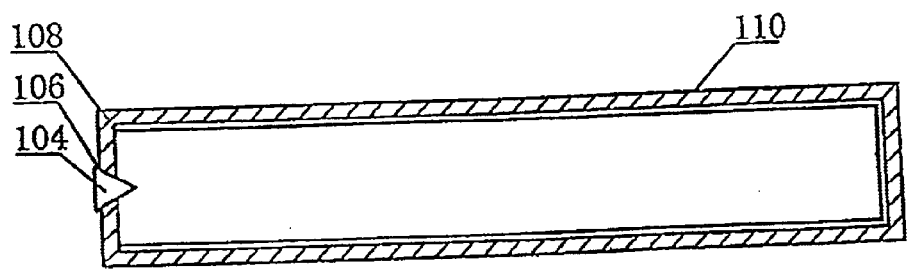
FIG. 1B shows a cross-sectional view of the element in FIG. 1A.

FIGS. 1A and 1B show perspective and cross-sectional views, respectively, of a heat-transfer pipe according to the present invention. As shown in these two diagrams, a heat-transfer pipe element 102 comprises a heat transfer medium 110 applied to a surface of inner wall of the heat-transfer pipe element, a cavity 105, a conduit 108, a bore 106, and a plug 104 for sealing the bore 106.

The heat transfer pipe elements of the present invention were jointed together with each, referred to as a pipe-pipe element, for practical uses. The pipe-pipe element had features such as high efficient heat transfer rate, well-distributed temperature, high variety in assembly, and changeable density of heat flow etc. The heat exchanger made of the pipe-pipe elements was characterized by compact or small volume and low surface dissipation which increased the heat efficiency and thus save electrical energy. The various pipe-pipe elements were independent so that damage to the end of any element would not result in mixing of two kinds of exchange fluids. Any damage to an individual pipe-pipe element would not affect the normal function of the other elements. Damage or malfunction in small parts of the pipe-pipe elements would not affect the normal operation of the entire equipment.

Procedure for Measuring Heat Transfer Efficiency

A pair of the pipe elements in Example 1 were made to demonstrate the thermal conductivity and effective thermal conductance of the heat transfer medium of the present invention and to exemplify the use of the material in a heat transfer process.

The demonstration tubes had dimensions of 2.5-cm diameter (dia.)×1.2-m length, with an open cylindrical attachment of 7.5-cm dia.×10-cm length welded to one end to accommodate a close-fitting and slightly tapered heater insert (5-cm dia.×9-cm length). The interiors of the demonstration tubes, after cleaning, were coated with a thin coating of the heat transfer medium of the present invention made according to the procedure recited above.

The demonstration heat transfer tubes were instrumented by attaching up to nine calibrated thermocouples at well-defined positions along the outer circumference of the tube. Temperatures at these points were monitored and recorded as they responded to varying levels of electrical heat input to the heater located at the base of the tube. In some instances, redundant temperature sensors and monitoring instruments were used, particularly at the two ends of the tube, to ensure that no significant mis-measurement of temperature occurred.

These experiments were performed in a safety-sealed vented closure of approximate dimensions 1.2×1.6×1.0 m. To minimize temperature stratification within the test chamber, the experiment was operated with a demonstration heat transfer tube situated at an angle of 10° from the horizontal. Input powers and temperatures were monitored in this configuration to quantify the heat transfer rate within the demonstration heat transfer tube.

The various temperatures were measured using seven Type J thermocouples placed equidistantly along the 1.2-meter section of the 2.5-cm diameter tube. Another thermocouple was placed on the larger diameter tube housing the heater. These thermocouples were held in place using steel hose clamps. The remaining thermocouple measured room temperature.

The thermocouples were connected to a Keithley #7057A thermocouple scanner card inside a Keithley 706 scanner. The junction block on the 7057A has a thermistor temperature sensor and was used to compensate for the cold-temperature junction. Standard fourth-order polynomials were used to perform the junction compensation and temperature calculations.

Power was supplied to the tube heater from a Hewlett Packard (HP) 66000A power supply mainframe with eight HP 66105A 1.25A/120V power modules. Two sets of four power supplies were wired in parallel, with the net output of the two sets wired in series to yield a 5 A/240 V power supply. This power supply system yields a very stable heater power over the length of the experiment. The actual current was measured as a voltage across a Kepco 0.1-Q/200 watt (W) standard current resistor in series with the heater. The heater voltage was measured by voltage sense wires attached to the heater terminals.

These two voltages were measured by a Keithley 7055 general purpose scanner card in the same model 706 scanner mentioned above. The output of the scanner boards were sent to a Keithley 195A 5 1 digital multi-meter (DMM) operating in direct current voltage mode. A Macintosh IIsi computer, using an IOTech model SCS1488 IEEE-488 interface, controlled the scanner and DMM. The results were saved to the computer's hard disk and accessed for analysis. The data acquisition software was written in Future Basic. The data, after analysis, was displayed using Microsoft Excel spreadsheet software.

Determination of Thermal Conductivity

After the tube was placed near horizontal, similar measurements were continued using up to 300 W input power, yielding a temperatures up to 150° C. above room temperature. Seven experiments were performed in the horizontal mode, including the final experiment where the power was stepped back and forth between 170 and 300 W over a 10-day period.

Several experiments were performed to measure the distribution of temperatures on the surface of the heat tube and the transient response to a step-function increase in heater input power. Nine identical and calibrated thermocouples were used in these tests: 1.) one thermocouple monitoring ambient temperature ($T_{air}$), 2.) one thermocouple affixed to the cylindrical heater mount ($T_{heat}$), and 3.) seven thermocouples placed equidistantly along the axis of the tube (at the "12:00" position, designated $T_2$ to $T_8$, with the smaller numbers closer to the heater).

Figure 1H:
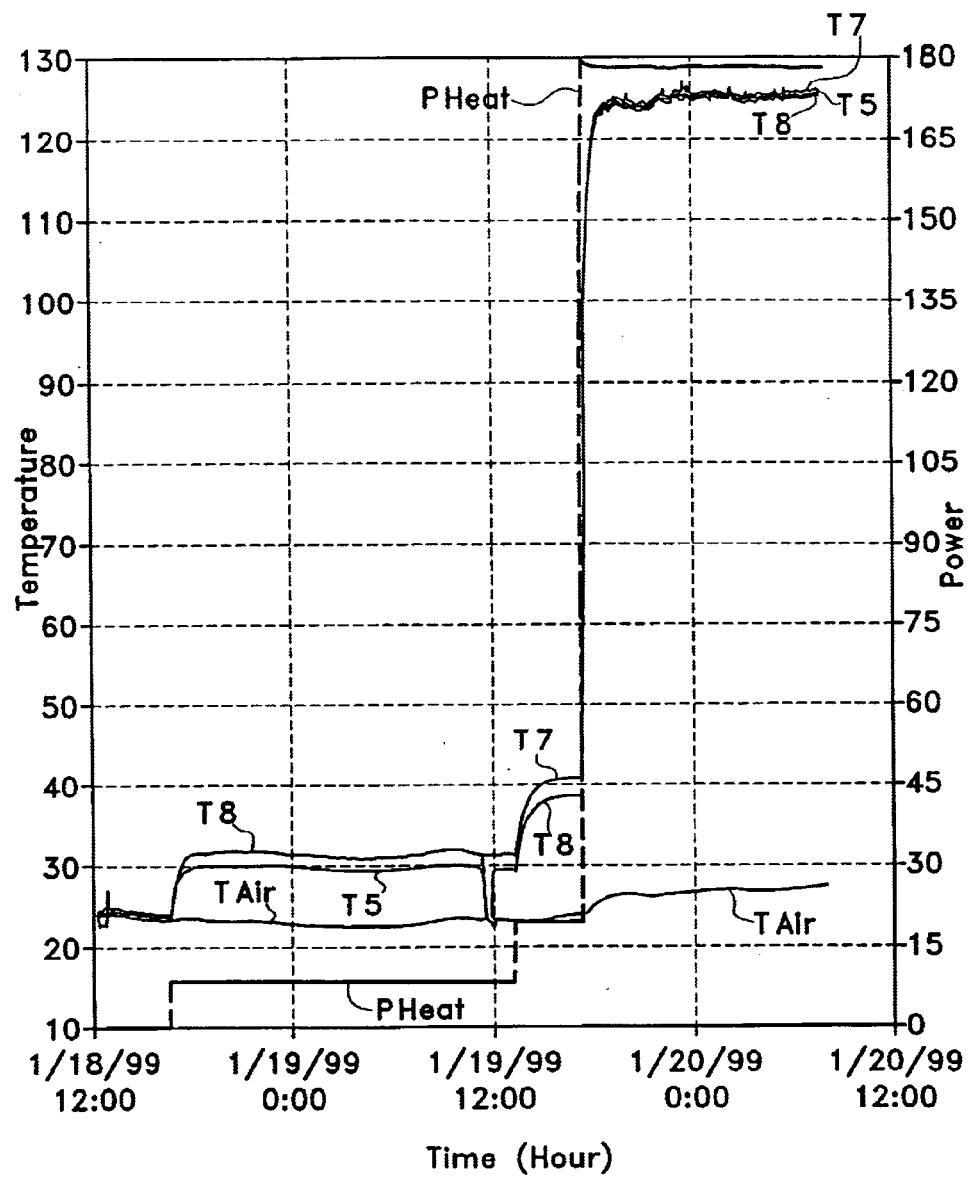
FIG. 1H shows the result of one such experiment in which the heater input power was stepped progressively from 9 to 20 to 178 watts.
Figure 1I:
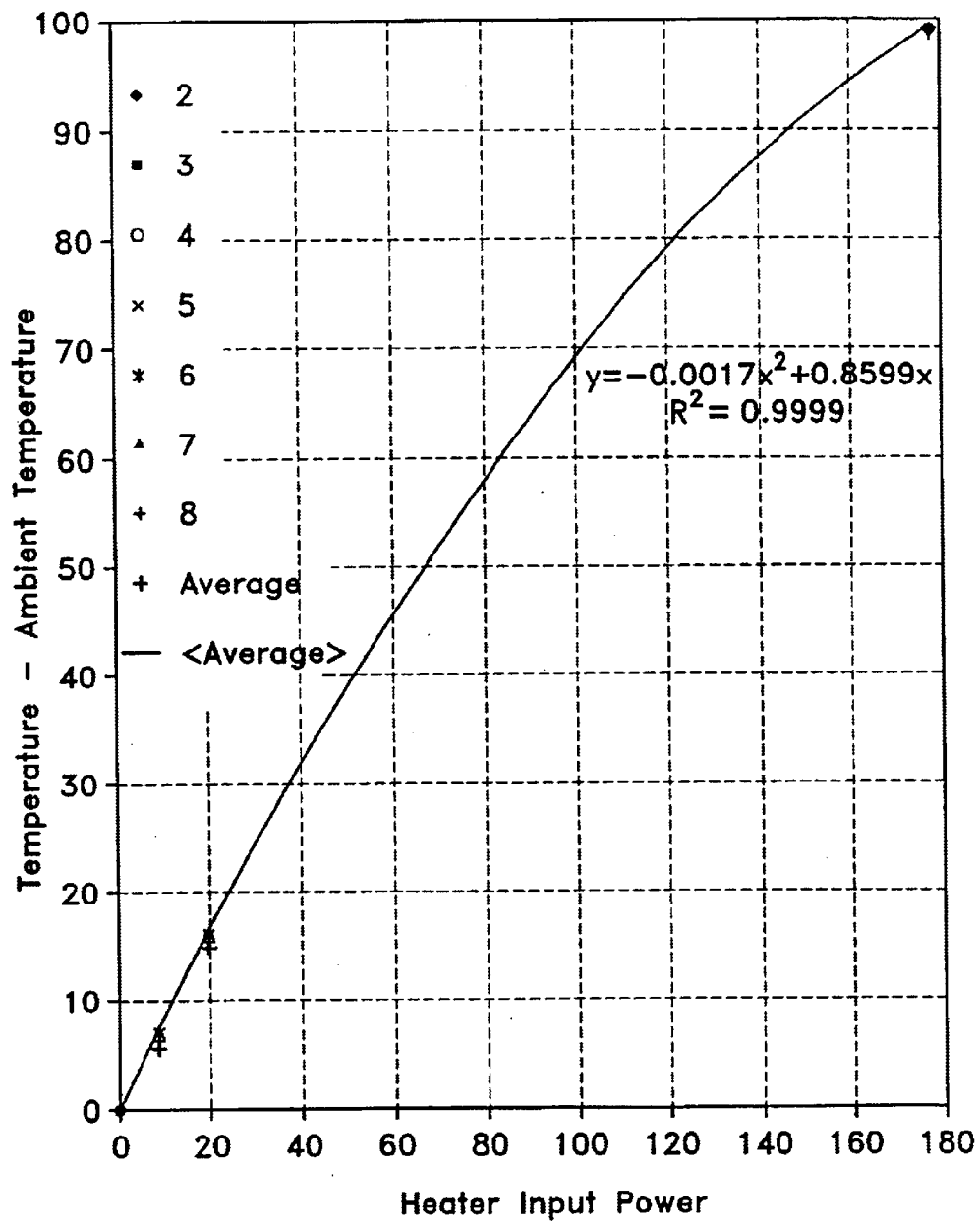
FIG. 1I is a plot of the steady-state temperature difference (sensor T° minus ambient T°) for each of the sensors and their mean value versus input power.

FIG. 1H shows the result of one such experiment in which the heater input power was stepped progressively from 9 to 20 to 178 W. FIG. 1I plots the steady-state temperature difference (sensor T° minus ambient T°) for each of the sensors and their mean value versus input power. The solid line in FIG. 1I is the quadratic best fit to the mean temperature values, with the coefficients specified. This line displays the expected form for heat dissipation from a pipe at uniform temperature, namely, a small negative second-order departure from linear dependence. What is unexpected is the degree to which the temperatures were, and remained, uniform along the extended length of an essentially empty pipe, heated at just one end.

Examining more closely the large power step from 20 to 178 W, it may be observed that the rise in temperature occured, on the time scale of measurement, quite quickly at all points along the heated demonstration tube. Temperature sensors $T_2$–$T_8$ and their average value are plotted as lines in FIG. 1J, as a function of time for the two hours immediately following the power step. For the first 45 minutes, data were collected every minute, following that, every 5 minutes. On the scales presented, no significant positional variation of temperature can be resolved; the demonstration tube behaved as if it were heated uniformly along its axis.

Figure 1J:
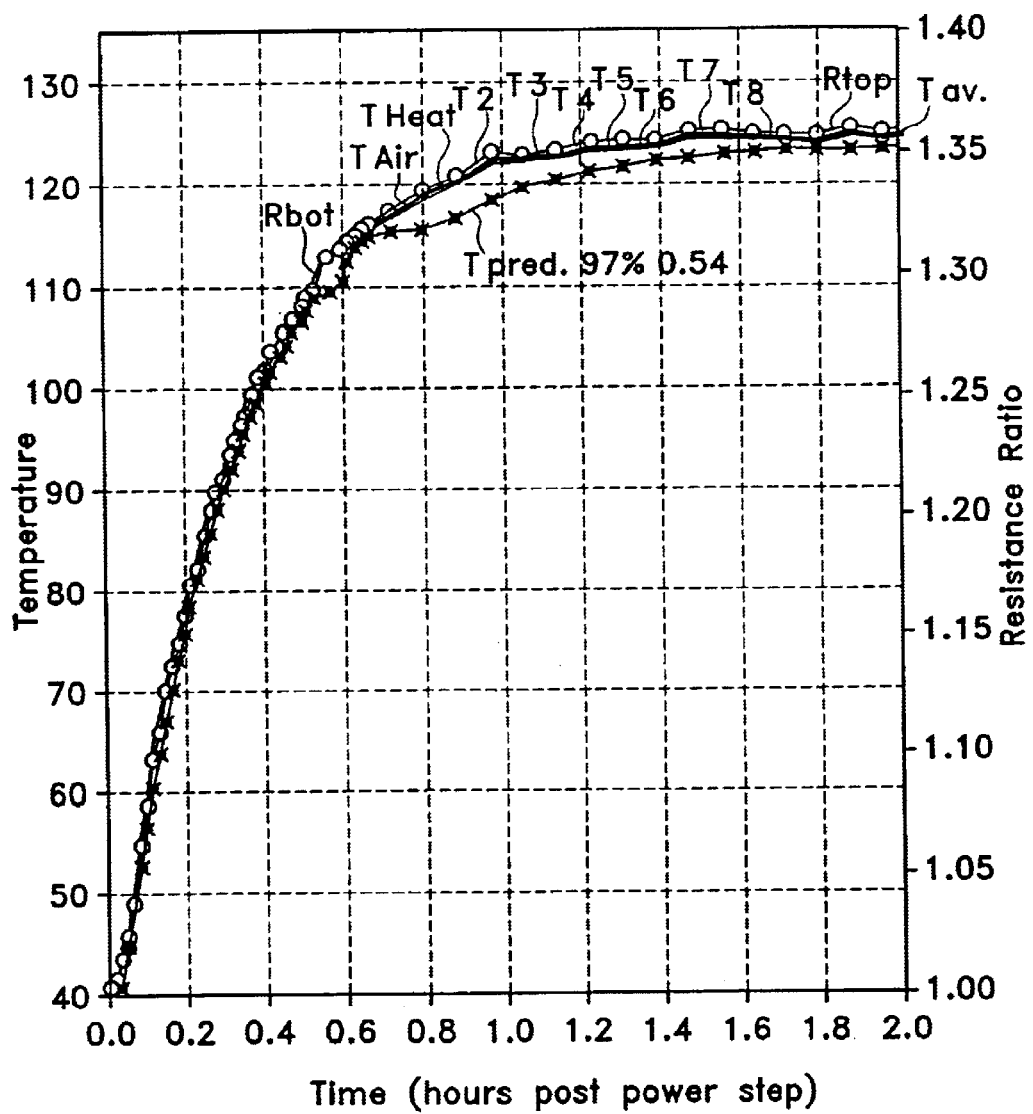
FIG. 1J shows transient temperature rise due to 20–178 watts heater power step.

Three other data sets were plotted in FIG. 1J, but they coincided so closely as to be difficult to resolve; the asterisks are the temperatures predicted for the dissipation of the heat corresponding to a 20 to 178 W power step to a uniformly heated horizontal steel pipe of dimensions identical to that of the heat tube. The details of this model are discussed below.

The points plotted as open diamonds and circles in FIG. 1J are ratios of resistances measured in the metal phase along the axis of the pipe. The resistance of a metal changes predictably with temperature according to the formula, $$R = R°(1 + \alpha T) \quad (1)$$

So that $$T = (R/R° - 1)/\alpha$$

where R° is the resistance measured at T=0° C.

Figure 1K:
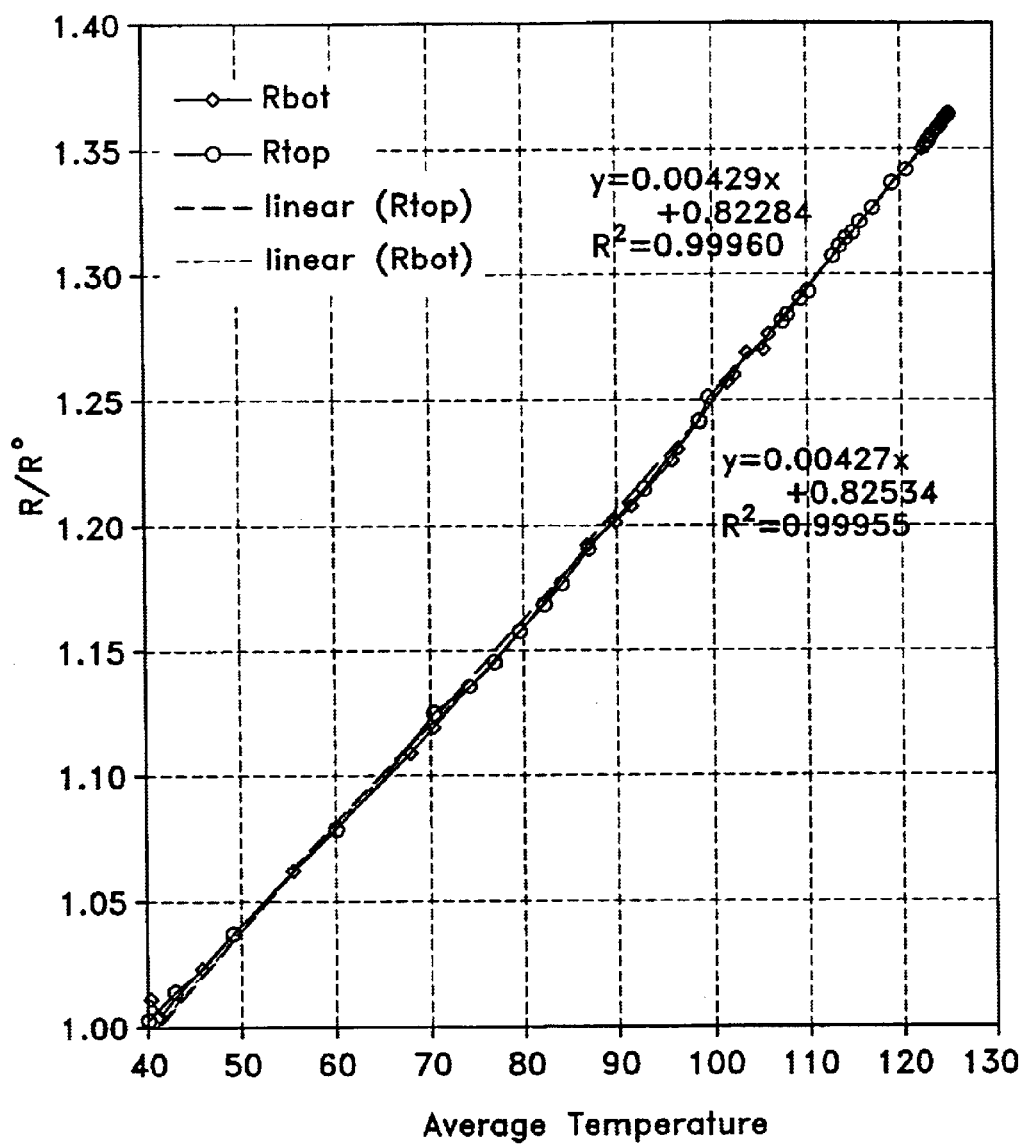
FIG. 1K shows these same resistance data plotted versus the mean temperature recorded by the thermocouple temperature sensors in the respective halves of the tube.

The data points labeled $R_{bot}$ refer to a resistance measurement made in the half of the tube closest to the heater, while those labeled $R_{top}$ refer to the resistance in the upper half of the tube. FIG. 1K shows these same resistance data plotted versus the mean temperature recorded by the thermocouple temperature sensors in the respective halves of the tube. From the regression lines plotted in FIG. 1K, it is clear that equation [1] above is well obeyed and that the temperature coefficient of resistance of the steel used in the tube is 0.428±0.001% $K^{-1}$.

The significance of the resistance data in FIGS. 1J and 1K is that 1.) there is no obvious error in the thermocouple temperature measurements, 2.) the measurements made on the surface of the tube conform closely with the volumetric temperatures recorded by the resistance ratio, and 3.) at all times, the average temperatures of the tube far from the heater were indistinguishable from those measured close to the heater despite the point location of the heat source.

Effective Heat Transfer Rates

The transfer of heat from carbon steel pipes is a very well known and very well understood problem of considerable engineering significance.

Figure 1L:
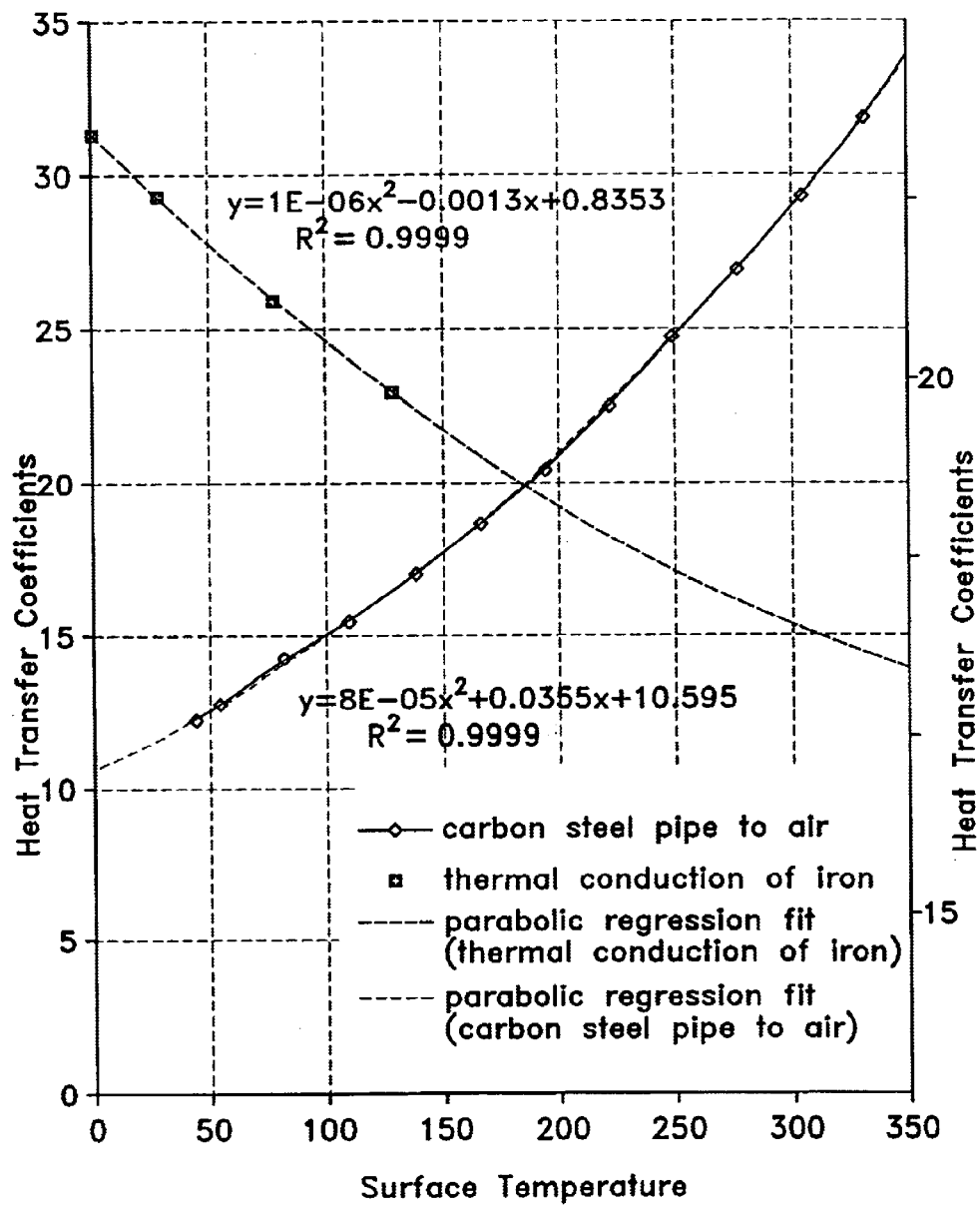
FIG. 1L shows the expected heat transfer coefficients for carbon steel pipe versus surface temperatures.

The rate of heat transfer by natural convection and radiation from the surface of a horizontal, bare, standard carbon steel pipe is well described in reference texts by a set of empirical equations and determined constants. FIG. 1L plots the expected heat transfer coefficient of a one inch-diameter carbon steel pipe, versus surface temperature. A parabolic regression line was fitted through the data points calculated from tabulated constants. This regression function was used to match the observed steady-state and transient response of the demonstration heat tube surface temperatures in response to stepped increases in the heater power.

A simple numerical model of 210×10 elements was constructed to solve the differential equation describing the rates of heat input, storage, and loss to the heat transfer tube. This model was constructed using two assumptions: 1.) the function presented in FIG. 1L accurately describes the heat loss from the tube surface, and 2.) the heat input at one end is communicated quite quickly (effectively instantaneously for the purposes of this calculation) to all parts of the metal tube.

This second assumption is consistent with observations and is, therefore, necessary to rationalize the data.

Figure 1M:
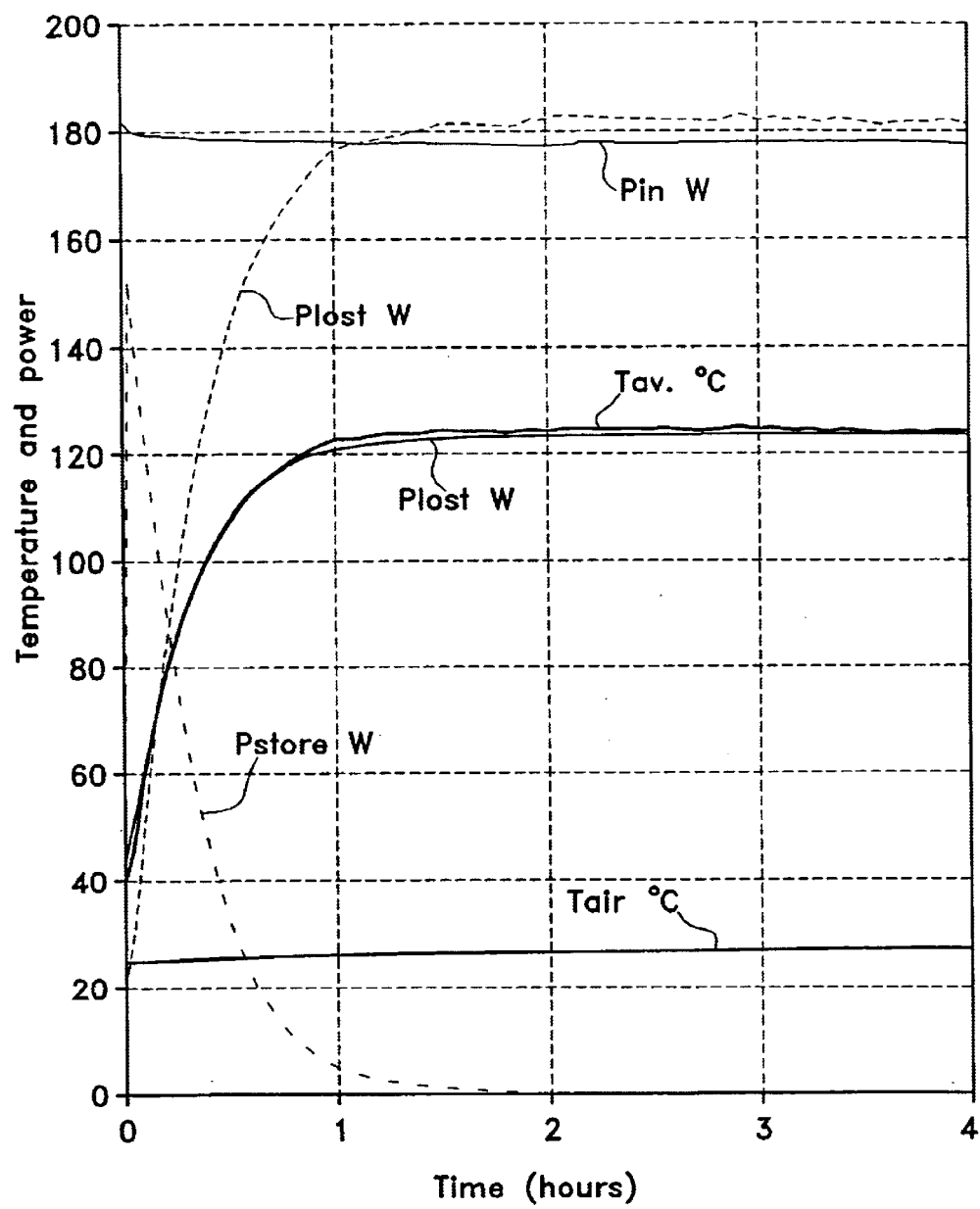
FIG. 1M shows the predicted and observed transition temperature response to a heater input power step from 20 to 178 watts.

FIG. 1M shows the results of one such numerical calculation and the heat transfer coefficients shown in FIG. 1L, with the heat capacity of steel assigned the value of 0.54 J $g^{-1}$. The (measured) input power is partitioned into an amount stored by the heat capacity of the tube ($P_{store}$) and an amount dissipated by natural convection and radiation to the ambient ($P_{lost}$). Taking into account the slight increase in the (measured) ambient temperature, the model predicted and the measured average temperature responses coincide closely. The predicted steady-state heat dissipation is slightly (2%) larger than the measured input power. This discrepancy is easily accommodated by model errors, the effects of temperature sensors on heat dissipation, and the 10° departure of the tube from horizontal configuration.

For the case shown in FIG. 1M, as well as several other cases tested, it is clear that the model assumptions are well obeyed. That is, the demonstration heat conductor tube acted thermally as a standard carbon steel pipe uniformly heated throughout.

Heat transfer coefficient

Above, for the purposes of the model, the assumption was made, consistent with observation, that the tube was uniformly heated. Since the demonstration heat transfer tube was actually heated only at one end, this assumption was evidently erroneous.

With the tube heated at one end, the pattern of heat flow can be modeled as a one-dimensional transmission line. Using this concept, heat is conducted, in each successive element from the heater along the tube length: 1.) axially by whatever medium fills the inner tube volume, 2.) radially through the steel wall to the outer surface (where temperature is monitored), 3.) radially to the surrounding ambient air, the temperature of which is considered to be fixed.

Taking these terms in reverse order, the rate of heat transfer from the tube surface to the surrounding air is the function described by the blue line in FIG. 1L. Also shown in FIG. 1L are known data for the thermal conduction of iron (Fe), together with a parabolic regression fit and extrapolation.

Figure 1N:
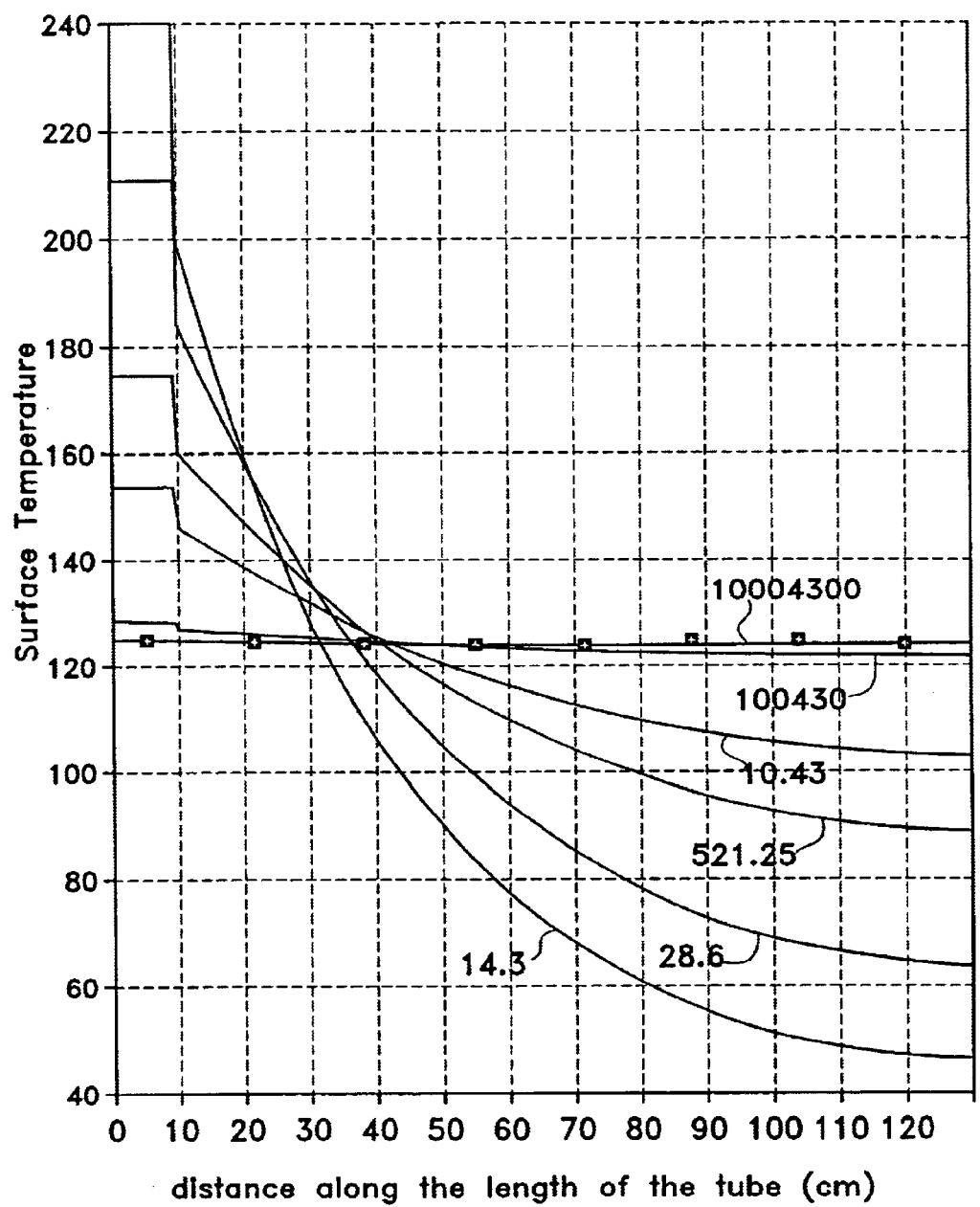
FIG. 1N shows the results of finite transmission line model calculations for the prediction of the temperature distribution along the tested heat tube.
Figure 1O:
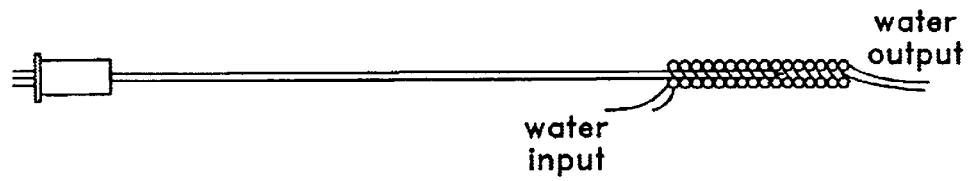
FIG. 1O shows a diagram of the demonstration heat transfer tube of the first heat exchanger attached (Diff1), designed to test the principle of measuring thermal conductivity in a differential temperature system.

FIG. 1N shows the results of comparative model calculations designed to predict the temperature distribution along the heat tube, performed as if the tube was filled with elemental silver (Ag). Silver is taken as a reference material because it is the best-known conductor of heat of all the elements in their normal allotropic form (diamond is superior in this regard). At 4.3 W $cm^{-1}$ $K^{-1}$, silver conducts heat about 5.5 times better than Fe (which is taken to represent the carbon steel of the pipe).

The upper line in FIG. 1N shows the expected distribution in temperature along the tube, calculated for heater input power of 178 W, presuming that the pipe is filled with a medium having the same thermal conductivity as silver (4.3 W $cm^{-1}$ $K^{-1}$). The temperatures measured under this condition at the eight sensors placed along the axis of the tube are shown by the solid data points.

FIG. 1N shows clearly that the measured temperature profile is much flatter than that predicted if the inner volume conducted heat at the rate and with the mechanism of solid silver metal. Calculations were performed assigning successively higher conductivities to the inner volume: 2×, 5×, 10×, 100×, and 1,000× that of silver. Only the last calculated value is consistent with the measured values. Said another way: the tube conducted heat as if it were filled with a material having a thermal conductivity much greater than, e.g., at least 1000 times, that of silver. Although the results are shown for only one test (at 178 W of heater input power), this conclusion is consistent with the results of numerous tests of the heat tubes, in more than one configuration, and for a range of input powers.

There are no other apparent explanations of the observed axial temperature profiles. For instance, although heat pipes (in which heat transfer occurs by evaporation, vapor transport, and condensation of a working fluid) transfer heat at high rates, evidence against such a possibility may be made on the basis of the wide range of operative temperatures possible for the demonstration heat transfer tubes. Heat pipes operate at discrete temperature points or intervals.

Determination of Effective Thermal Conductance

A classical heat pipe's heat flux ($\Phi$) is calculated as the input power (W) over the pipe's cross-sectional area. The maximum heat flux is determined by plotting the measured temperature difference (T) between the sink and source ends of the heat pipe versus $\Phi$, under no-load conditions. The value of $\Phi$, where the T/$\Phi$ value deviates from that measured in the normal operating region, is the maximum heat flux density ($\Phi_{MAX}$). The temperature at the source and sink of the demonstration heat transfer tube was measured as the input power (expressed as heat flux density) was increased. No maximum heat flux density ($\Phi_{MAX}$) was calculated, because the T/$\Phi$ plot showed no positive deviation in T.

A classical heat pipe's effective thermal conductance ($K_{eff}$) is calculated by treating the pipe as a monolithic thermal conductor. Hence ($K_{eff}$) is defined as $$(K_{eff})=[P(W)\cdot 1/A]/(T_2-T_1)(K)$$

where P in the input power, I is the length of the tube, A is the tube's cross-sectional area, $T_2$ is the temperature at the sink end of the tube, and $T_1$ is the temperature at the source end. The source and sink temperatures were measured. Several temperatures in between the ends were also measured while the input power was varied under no-load conditions. All the experiments were performed without insulation wrapped around the pipe.

Another approach in measuring ($K_{eff}$) is to perform the same studies under different loads, allowing better control of operating temperature. The same experiments described above were then performed with three different heat exchangers attached to the sink end of the demonstration heat transfer tube. The source and sink temperatures were measured. Temperatures at locations intermediate the ends were also measured while varying the input power under varying load conditions. The load was supplied by circulating constant temperature water through the heat exchanger using a 6000-W recirculating chiller. $K_{eff}$ was calculated according to equation (1).

FIG. 10 shows a diagram of the demonstration heat transfer tube with the first heat exchanger attached. This configuration was referred to as Diff1 and was designed to test the principle of measuring thermal conductivity in a differential temperature system.

Figure 1P:
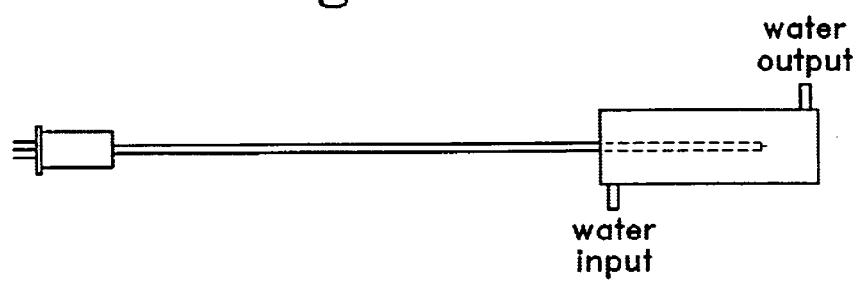
FIG. 1P shows another kind of heat transfer tube (Diff2) with a hollow acrylic cylinder attached to the end of the heat transfer tube with water flowing through the cylinder.

The first heat exchanger was a copper coil held to the demonstration heat transfer tube using Omegatherms 200 high thermal conductivity epoxy paste. However, the conductivity of this epoxy was only ~0.003 times that of copper. Hence the epoxy presented a significant thermal resistance to heat flowing into the heat exchanger. To eliminate this thermal resistance, a second design, Diff2-using a second demonstration heat transfer tube, was made up of a hollow acrylic cylinder attached to the end of the demonstration heat transfer tube with water flowing through the cylinder. Diff2 is shown in FIG. 1P.

Figure 1Q:
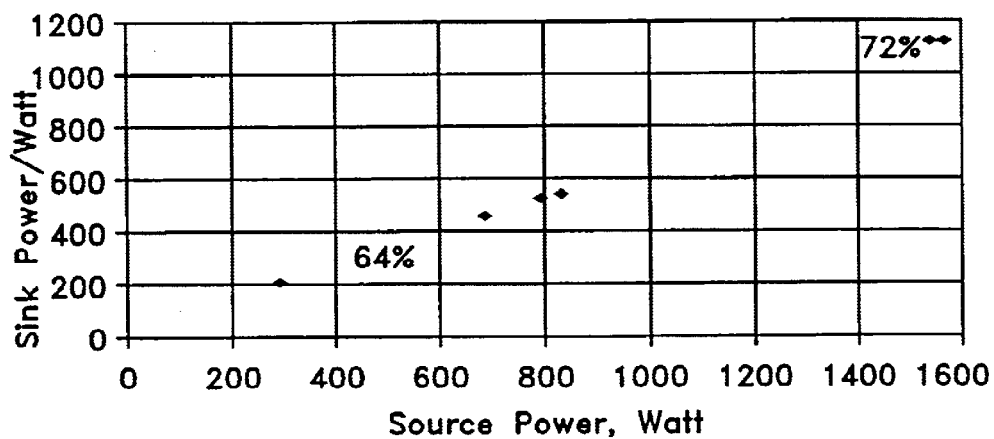
FIG. 1Q shows these two calorimeter designs, Diff1 and Diff2, operated in the range of input powers from 100 to 1500 W and flow rates from 1 to 85 g/sec. The corresponding heat flux densities (phi) range $0.11 \times 10^6$ to $1.7 \times 10^6$ W/m$^2$ and the heat recovery ranges from 300 to 1500 watts.

These two calorimeter designs, Diff1 and Diff2, were operated in the range of input powers from 100 to 1500 W and flow rates from 1 to 85 g/sec. These correspond to heat flux densities (phi) of $0.11 \times 10^6$ to $1.7 \times 10^6$ W/m$^2$. The heat recovery from 300 to 1500 watts is shown in FIG. 1Q.

Figure 1R:
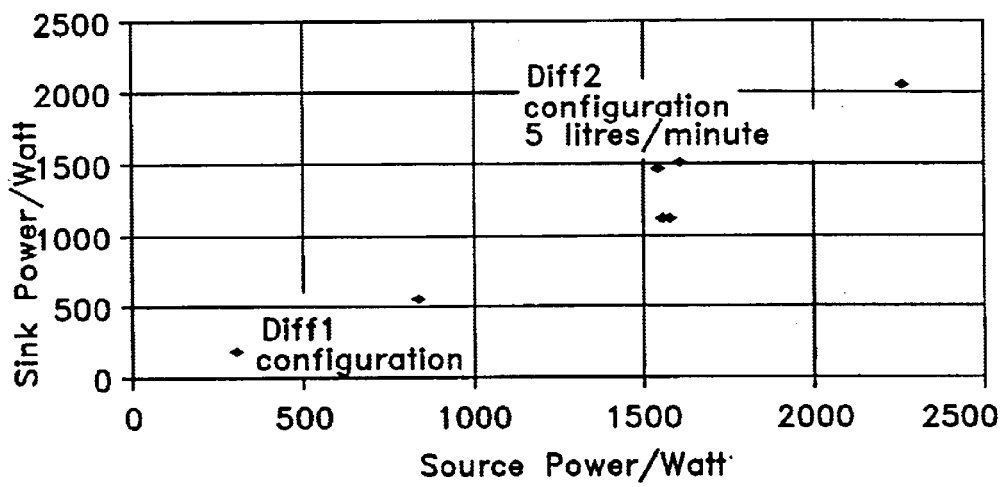
FIG. 1R shows the heat recovery profile along the demonstration heat transfer tube measured using Diff1 and Diff2.

The efficiency using Diff1 was about 72% and using Diff2 was about 93%. This difference in efficiency was as expected considering the relatively poor thermal conductivity epoxy used in Diff1. FIG. 1R shows the heat recovery profile along the demonstration heat transfer tube measured using Diff1 and Diff2.

Figure 1S:
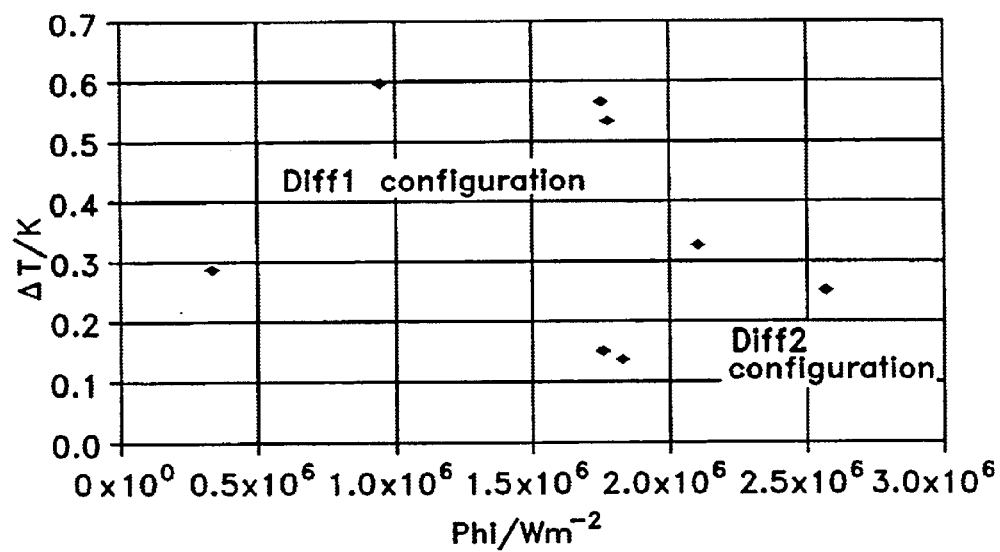
FIG. 1S is a plot of the difference of these two temperatures versus heat flux density.

Because of the higher thermal recovery efficiency, input powers up to 3000 watts using Diff2 were used. In both cases the temperature was highest 27 cm from the heater. This was compared to the temperature 107 cm from the heater because temperatures farther from the heater were colder, due to the influence of the heat exchanger. The difference of these two temperatures was plotted versus heat flux density and is shown in FIG. 1S.

The useful operating range of the classical heat pipe will be where the plot remains linear or shows a negative deviation. Above the useful operating temperature, T will become disproportionately larger, because heat is transported less efficiently to the sink end of the tube. For all conditions measured, T of the demonstration heat transfer tube increased with heat flux density, showing that the maximum heat flux density was never achieved. The only exception was above 2000 W when the 107-cm temperature was greater than the 27-cm temperature. For this reason, data above 2000 W input power, $2.2 \times 10^6$ W/m$^2$ were not plotted.

Figure 1T:
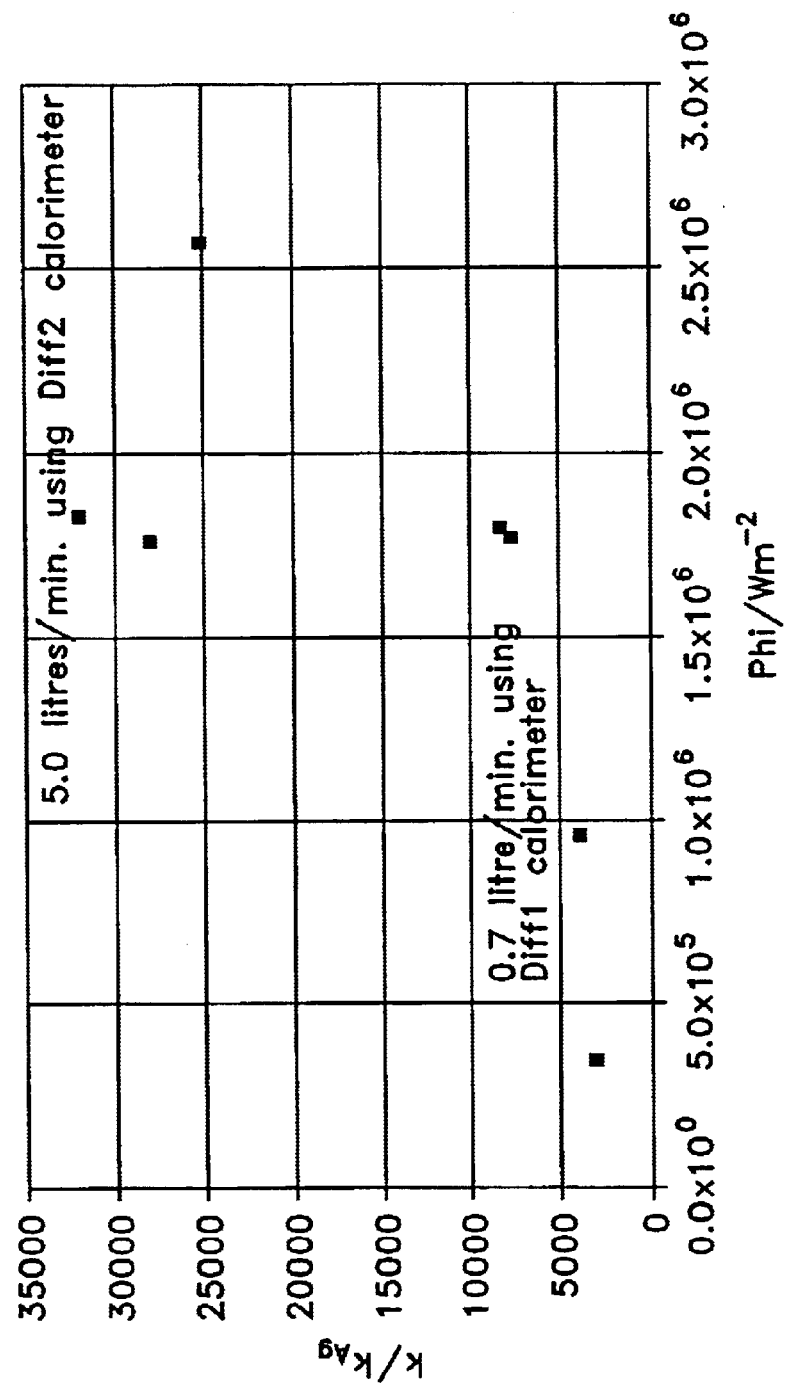
FIG. 1T shows the measurements of effective thermal conductance versus heat flux density for all input powers up to 2000 W, $2.2 \times 10^6$ W/m$^2$.

FIG. 1T summarized the measurements of effective thermal conductance versus heat flux density for all input powers up to 2000 W, $2.2 \times 10^6$ W/m$^2$. These are presented as a ratio of ($K_{eff}$) to the thermal conductivity of silver (for comparison with what would be expected if the pipe were filled with solid silver, the highest thermally conducting metal). The maximum ratio found was greater than 30,000.

Although I have shown and described specific embodiments of the present invention, further modifications and improvements will occur to those skilled in the art. I desire it to be understood, therefore, that this invention is not limited to the particular forms shown and I intend the appended claims to cover all modifications that do not depart from the spirit and scope of the present invention.

I claim as my invention:

1. A heat transfer element comprising a high heat transfer medium, wherein the high heat transfer medium is formed by dissolving the following compounds in water to produce a mixture, and drying the resulting mixture to produce said heat transfer medium product with said compounds in the following weight percentages:
   (1) Cobaltic Oxide ($Co_2O_3$), 0.5–1.0%;
   (2) Boron Oxide ($B_2O_3$), 1.0–2.0%;
   (3) Calcium Dichromate ($CaCr_2O_7$), 1.0–2.0%;
   (4) Magnesium Dichromate ($MgCr_2O_7 \cdot 6H_2O$), 10.0–20.0%;
   (5) Potassium Dichromate ($K_2Cr_2O_7$), 40.0–80.0%;
   (6) Sodium Dichromate ($Na_2Cr_2O_7$), 10.0–20.0%;
   (7) Beryllium Oxide (BeO), 0.05–0.10%;
   (8) Titanium Diboride ($TiB_2$), 0.5–1.0%;
   (9) Potassium Peroxide ($K_2O_2$), 0.05–0.10%;
   (10) A selected metal or ammonium Dichromate ($MCr_2O_7$), 5.0–10.0%; where "M" is selected from the group consisting of potassium, sodium, silver, and ammonium,

(11) Strontium Chromate ($SrCrO_4$), 0.5–1.0%; and,
(12) Silver Dichromate ($Ag_2Cr_2O_7$), 0.5–1.0%. the heat transfer medium is positioned on a substrate.

2. A heat transfer element according to claim 1, wherein the weight percentages in the heat transfer product are:
(1) Cobaltic Oxide ($Co_2O_3$), 0.7–0.8%;
(2) Boron Oxide ($B_2O_3$), 1.4–1.6%;
(3) Calcium Dichromate ($CaCr_2O_7$), 1.4–1.6%;
(4) Magnesium Dichromate ($MgCr_2O_7.6H_2O$), 14.0–16.0%;
(5) Potassium Dichromate ($K_2Cr_2O_7$), 56.0–64.0%;
(6) Sodium Dichromate ($Na_2Cr_2O_7$), 14.0–16.0%;
(7) Beryllium Oxide (BeO), 0.07–0.08%;
(8) Titanium Diboride ($TiB_2$), 0.7–0.8%;
(9) Potassium Peroxide ($K_2O_2$), 0.07–0.08%;
(10) A selected metal or Ammonium Dichromate ($MCr_2O_7$), 7.0–8.0%; where "M" is selected from the group consisting of potassium, sodium, silver, and ammonium;
(11) Strontium Chromate ($SrCrO_4$), 0.7–0.8%; and,
(12) Silver Dichromate ($Ag_2Cr_2O_7$), 0.7–0.8%.

3. A heat transfer element according to claim 1, wherein the weight percentages in the heat transfer medium product are:
(1) Cobaltic Oxide ($Co_2O_3$), 0.723%;
(2) Boron Oxide ($B_2O_3$), 1.4472%;
(3) Calcium Dichromate ($CaCr_2O_7$), 1.4472%;
(4) Magnesium Dichromate ($MgCr_2O_7.6H_2O$), 14.472%;
(5) Potassium Dichromate ($K_2Cr_2O_7$), 57.888%; Sodium Dichromate ($Na_2Cr_2O_7$), 14.472%; Beryllium Oxide (BeO), 0.0723%;
(8) Titanium Diboride ($TiB_2$), 0.723%;
(9) Potassium Peroxide ($K_2O_2$), 0.0723%;
(10) (10) A selected metal or Ammonium Dichromate ($MCr_2O_7$), 7.23%; where "M" is selected from the group consisting of potassium, sodium, silver, and ammonium;
(11) Strontium Chromate ($SrCrO_4$), 0.723%; and
(12) Silver Dichromate ($Ag_2Cr_2O_7$), 0.723%.

4. A heat transfer element according to claim 1, wherein the heat transfer element is a heating element.

5. A heat transfer element according to claim 1, wherein the heat transfer element is a heat-dissipating element.

6. A heat transfer element according to according to claim 1, wherein the heat transfer element is a heat exchange element.

7. A heat transfer medium formed by dissolving the following compounds in water in the listed amounts (+/− 0.10% per compound) to produce a mixture, and drying the resulting mixture to produce said heat transfer medium product:
1. Cobaltic Oxide ($Co_2O_3$), 0.01 g;
2. Boron Oxide ($B_2O_3$), 0.02 g;
3. Calcium Dichromate ($CaCr_2O_7$), 0.02 g;
4. Magnesium Dichromate ($MgCr_2.6H_2O$), 0.2 g;
5. Potassium Dichromate ($K_2Cr_2O_7$), 0.8 g;
6. Sodium Dichromate ($Na_2Cr_2O_7$), 0.2 g;
7. Beryllium Oxide (BeO), 0.001 g;
8. Titanium Diboride ($TiB_2$), 0.01 g;
9. Potassium Peroxide ($K_2O_2$), 0.001 g;
10. "M" Dichromate ($MCr_2O_7$), 0.1 g; where "M" is selected from the group consisting of potassium, sodium, silver, and ammonium,
11. Strontium Chromate ($SrCrO_4$), 0.01 g; and
12. Silver Dichromate ($Ag_2Cr_2O_7$), 0.01 g.

8. The high thermal conductivity heat transfer medium of claim 7 where the thermal conductivity of the heat transfer medium product is greater than 32,000 times that of metallic silver.

9. A heat transfer surface comprising a surface substrate covered at least in part by a heat transfer medium with high heat transfer rate formed by dissolving the following compounds in water to produce a mixture, and drying the resulting mixture to produce said heat transfer medium product with said compounds in the following weight percentages:
1. Cobaltic Oxide ($Co_2O_3$), 0.5%–1.0%;
2. Boron Oxide ($B_2O_3$), 1.0%–2.0%;
3. Calcium Dichromate ($CaCr_2O_7$), 1.0%–2.0%;
4. Magnesium Dichromate ($MgCr_2O_7.6H_2O$), 10.0%–20.0%;
5. Potassium Dichromate ($K_2Cr_2O_7$), 40.0%–80.0%;
6. Sodium Dichromate ($Na_2Cr_2O_7$), 10.0%–20.0%;
7. Beryllium Oxide (BeO), 0.05%–0.10%;
8. Titanium Diboride ($TiB_2$), 0.5%–1.0%;
9. Potassium Peroxide ($K_2O_2$), 0.05%–0.10%;
10. A metal or ammonium Dichromate ($MCr_2O_7$), 5.0%–10.0%; where "M" is selected from the group consisting of potassium, sodium, silver, and ammonium
11. Strontium Chromate ($SrCrO_4$), 0.5%–1.0%; and,
12. Silver Dichromate ($Ag_2Cr_2O_7$), 0.5%–1.0%.

10. The heat transfer surface of claim 9 wherein the heat transfer medium with high heat transfer rate is comprised of weight percentages in the said heat transfer medium product of:
1. Cobaltic Oxide ($Co_2O_3$), 0.7–0.8%;
2. Boron Oxide ($B_2O_3$), 1.4–1.6%;
3. Calcium Dichromate ($CaCr_2O_7$), 1.4–1.6%;
4. Magnesium Dichromate ($MgCr_2O_7.6H_2O$), 14.0–16.0%;
5. Potassium Dichromate ($K_2Cr_2O_7$), 56.0–64.0%;
6. Sodium Dichromate ($Na_2Cr_2O_7$), 14.0–16.0%;
7. Beryllium Oxide (BeO), 0.07–0.08%;
8. Titanium Diboride ($TiB_2$), 0.7–0.8%;
9. Potassium Peroxide ($K_2O_2$), 0.07–0.08%;
10. A metal or ammonium Dichromate ($MCr_2O_7$), 7.0–8.0%; where "M" is selected from the group consisting of potassium, sodium, silver, and ammonium,
11. Strontium Chromate ($SrCrO_4$), 0.7–0.8%; and,
12. Silver Dichromate ($Ag_2Cr_2O_7$), 0.7–0.8%.

11. The heat transfer surface of claim 9 wherein the heat transfer medium with high heat transfer rate is comprised of weight percentages in the said heat transfer medium product are:
1. Cobaltic Oxide ($Co_2O_3$), 0.723%;
2. Boron Oxide ($B_2O_3$), 1.4472%;
3. Calcium Dichromate ($CaCr_2O_7$), 1.4472%;
4. Magnesium Dichromate ($MgCr_2O_7.6H_2O$), 14.472%;
5. Potassium Dichromate ($K_2Cr_2O_7$), 57.888%;
6. Sodium Dichromate ($Na_2Cr_2O_7$), 14.472%;
7. Beryllium Oxide (BeO), 0.0723%;

8. Titanium Diboride ($TiB_2$), 0.723%;
9. Potassium Peroxide ($K_2O_2$), 0.0723%;
10. A metal or ammonium Dichromate ($MCr_2O_7$), 7.23%; where "M" is selected from the group consisting of potassium, sodium, silver, and ammonium;
11. Strontium Chromate ($SrCrO_4$), 0.723%; and,
12. Silver Dichromate ($Ag_2Cr_2O_7$), 0.723%.

12. The heat transfer surface of claim 9 wherein the heat transfer medium with high heat transfer rate has a thermal conductivity greater than 32,000 times that of metallic silver.

13. The heat transfer surface of claim 10 wherein the heat transfer medium with high heat transfer rate has a thermal conductivity greater than 32,000 times that of metallic silver.

14. The heat transfer surface of claim 11 wherein the heat transfer medium with high heat transfer rate has a thermal conductivity greater than 4,000 times that of metallic silver.

15. A heat transfer surface comprising a surface substrate covered at least in part by a heat transfer medium with high heat transfer rate formed by dissolving the following compounds in water in the listed amounts (+/−0.10% per compound) to produce a mixture, and drying the resulting mixture to produce said heat transfer medium product:

(1) Cobaltic Oxide ($Co_2O_3$), 0.01 g;
(2) Boron Oxide ($B_2O_3$), 0.02 g;
(3) Calcium Dichromate ($CaCr_2O_7$), 0.02 g;
(4) Magnesium Dichromate ($MgCr_2.6H_2O$), 0.2 g;
(5) Potassium Dichromate ($K_2Cr_2O_7$), 0.8 g;
(6) Sodium Dichromate ($Na_2Cr_2O_7$), 0.2 g;
(7) Beryllium Oxide (BeO), 0.001 g;
(8) Titanium Diboride ($TiB_2$), 0.01 g;
(9) Potassium Peroxide ($K_2O_2$), 0.001 g;
(10) "M" Dichromate ($MCr_2O_7$), 0.1 g; where "M" is selected from the group consisting of potassium, sodium, silver, and ammonium,
(11) Strontium Chromate ($SrCrO_4$), 0.01 g; and
(12) Silver Dichromate ($Ag_2Cr_2O_7$), 0.01 g.

16. The heat transfer surface of claim 15 wherein the heat transfer medium with high heat transfer rate product has a thermal conductivity greater than 32,000 times that of metallic silver.

* * * * *